United States Patent
Delaporte

(10) Patent No.: US 6,469,499 B2
(45) Date of Patent: Oct. 22, 2002

(54) APPARATUS AND METHOD FOR LOW POWER POSITION SENSING SYSTEMS

(75) Inventor: Dany Paul Delaporte, Lake Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/777,327

(22) Filed: Feb. 6, 2001

(65) Prior Publication Data

US 2002/0105319 A1 Aug. 8, 2002

(51) Int. Cl.⁷ .............................. G01B 7/30; E05F 15/10
(52) U.S. Cl. ............................ 324/207.13; 324/207.25; 49/28
(58) Field of Search ...................... 324/207.13, 207.25; 49/28; 340/672

(56) References Cited

U.S. PATENT DOCUMENTS

| | | | |
|---|---|---|---|
| 3,777,121 A | * 12/1973 | Jamieson ................. 324/76.62 |
| 4,262,526 A | * 4/1981 | Makita et al. ................. 73/116 |
| 4,384,252 A | 5/1983 | Kolter .......................... 324/239 |
| 4,453,420 A | * 6/1984 | Nakane et al. .......... 73/862.326 |
| 4,613,959 A | * 9/1986 | Jiang ............................ 365/200 |
| 4,819,379 A | 4/1989 | Kenzelmann et al. .......... 49/280 |
| 5,039,925 A | 8/1991 | Schap .......................... 318/282 |
| 5,057,727 A | 10/1991 | Jones ............................ 310/68 |
| 5,196,841 A | * 3/1993 | Harder et al. ............... 340/5.73 |
| 5,530,298 A | 6/1996 | Gerhold ........................ 307/106 |
| 5,670,877 A | * 9/1997 | Scheiber ................. 324/207.25 |
| 5,880,367 A | * 3/1999 | Vaughn .......................... 73/488 |
| 5,955,878 A | * 9/1999 | Peilloud et al. ............. 324/165 |
| 5,982,126 A | * 11/1999 | Hellinga et al. ............. 318/468 |
| 6,084,400 A | * 7/2000 | Steinich et al. ......... 324/207.13 |
| 6,134,837 A | * 10/2000 | Kawanobe et al. ............ 49/360 |
| 6,211,670 B1 | * 4/2001 | DeWilde et al. ......... 324/207.21 |
| 6,297,605 B1 | * 10/2001 | Butler et al. ................ 318/466 |

FOREIGN PATENT DOCUMENTS

| | | |
|---|---|---|
| EP | 0212118 | 3/1987 |
| EP | 0621460 | 10/1994 |
| JP | 61200430 | 9/1986 |
| JP | 63292082 | 11/1988 |
| JP | 03078619 | 4/1991 |

* cited by examiner

*Primary Examiner*—Edward Lefkowitz
*Assistant Examiner*—Darrell Kinder
(74) *Attorney, Agent, or Firm*—Kathryn A. Marra

(57) ABSTRACT

A very low power quadrature position sensing system that includes a first sensor, which defines a starting point of a first channel. First sensor is coupled to a first square wave generator. A second sensor, in quadrature with first sensor, defining a starting point of a second channel, with second sensor coupled to a second square wave generator. The system further includes a moving member having a magnetized surface with a magnetic distribution disposed on the magnetized surface. The magnetized surface is sensed by the first sensor, and the second sensor during movement by the moving member, the first sensor generates a high signal forming a rising edge of a square wave generated by the first square wave generator and the first sensor generates a low signal forming a falling edge of a square wave generated by the first square wave generator, and during movement of the moving member, the second sensor generates a high signal forming a rising edge of a square wave generated by the second square wave generator and the second sensor generates a low signal forming a falling edge of the square wave generated by the second square wave generator. A method for very low power quadrature position sensing includes the determination of a first set of sensed signals using a first sensor and the determination of a second set of sensed signals using a second sensor. The method includes the derivation of a first sequence of square waves from the first set of sensed signals. The method further includes the derivation of a second sequence of square waves from the second set of sensed signals that are in quadrature with the first sequence of square waves. The method also includes the generation of a redundancy sequence signal using a redundancy circuit that comprises a switch.

22 Claims, 9 Drawing Sheets

APPARATUS AND METHOD FOR LOW POWER POSITION SENSING SYSTEMS

TECHNICAL FIELD

This application relates to position sensors, and more particularly, to a vehicle door position sensing system.

BACKGROUND

In order to determine the position of a vehicle door an optical position encoder is employed. An optical sensor may draw as much as 35–40 mA of current whenever a vehicle door is open so as to keep track of the door or gate position. This current consumption is undesirable as it will discharge the vehicle battery. To conserve energy, some systems shut down after the vehicle door has been opened for an extended period of time. However, once the system is shut down, the current position of the door must be determined again after the system is powered back up. Accordingly, there is a need for a position sensor for use in automotive applications whereby the electrical draw of such a sensor is limited.

SUMMARY

A position sensing system that utilizes a sensor or sensors to provide an output corresponding to the position of an object is disclosed in this application. The sensor output is converted to logic level signals, which are inputted into a control system. The position sensing system utilizes a sensor or sensors requiring no external power and provide an output corresponding to the position of an object.

A very low power quadrature position sensing system includes a first sensor, which defines a starting point of a first channel. The first sensor is coupled to a first square wave generator. A second sensor signal is in quadrature with the first sensor. The second sensor defines a starting point of a second channel having very low energy consumption. The second sensor is coupled to a second square wave generator. In one embodiment, the system includes a fixed member having a first sensor, and a second sensor, and a moving member which moves relative to the fixed member. The moving member has a magnetized surface. The magnetized surface has a magnetic distribution disposed thereon to be sensed by both the first sensor, and the second sensor. During movement by the moving member, the first sensor generates a high signal and a low signal. The high signal forms a rising edge and the low signal forms a falling edge of a square wave generated by the first square wave generator. During movement of the moving member, the second sensor generates a high signal and a low signal. The high signal forms a rising edge and the low signal forms a falling edge of the square wave generated by the second square wave generator. An exemplary method for very low power quadrature position sensing includes a determination of a first set of sensed signals using a first sensor and a determination of a second set of sensed signals using a second sensor. A first sequence of square waves is determined from the first set of sensed signals. The method further includes a derivation of a second sequence of square waves from the second set of sensed signals that are in quadrature with the first sequence of square waves. A redundancy sequence signal is generated using a redundancy circuit that comprises a transistor, electronic switch, or equivalent thereof.

BRIEF DESCRIPTION OF THE DRAWINGS

The present invention will now be described, by way of an example, with references to the accompanying drawings, in which.

DESCRIPTION OF THE PREFERRED EMBODIMENT

Figure 1:
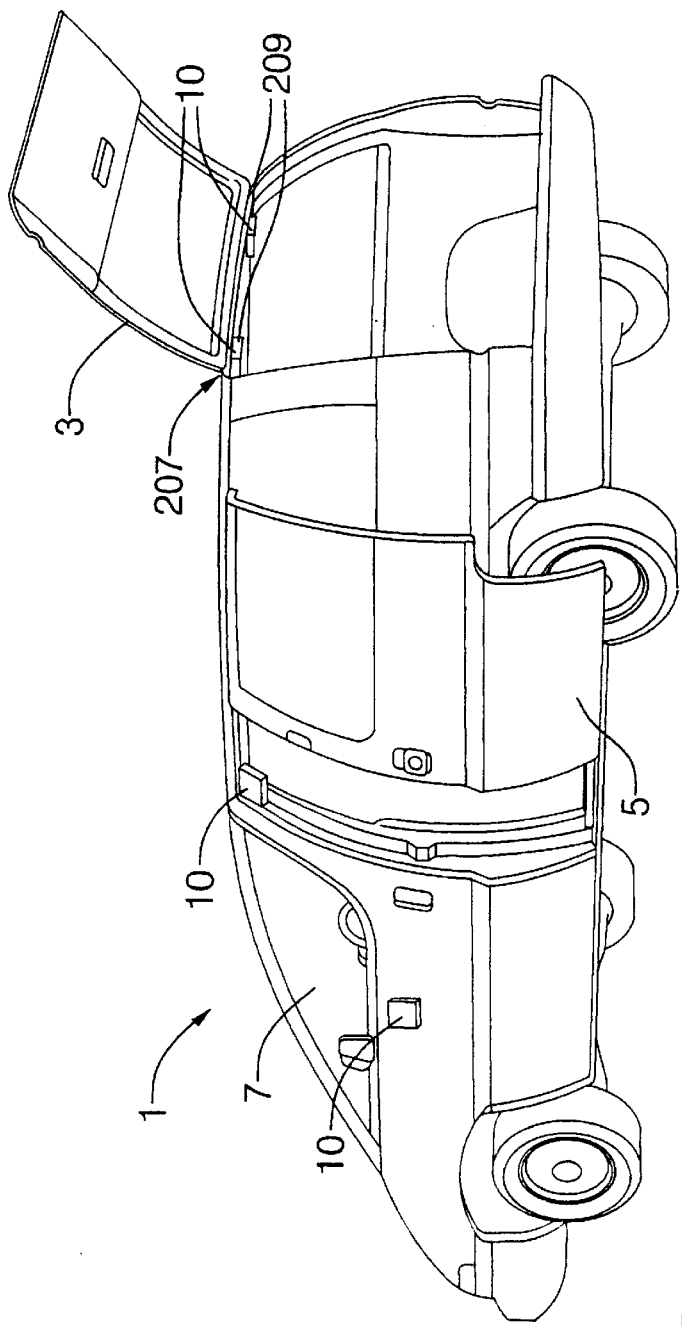
FIG. 1 is a schematic diagram illustrating sensors installed in a vehicle.

Referring now to FIG. 1, a sensor assembly 10 is illustrated in an application with a vehicle 1. The vehicle 1 has a sliding door 5 and a lift gate 3 as well as a window 7. The sensor assembly 10 is depicted illustratively to show possible applications and locations within a vehicle, however, sensor assembly 10 is not limited to the applications illustrated.

Figure 2:
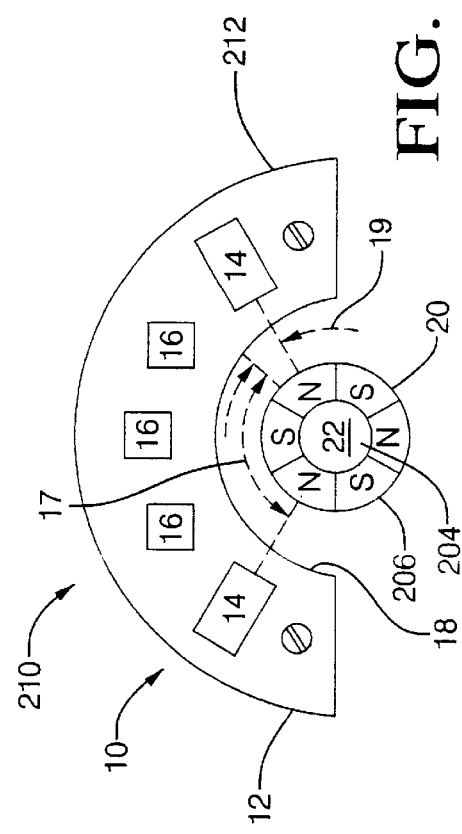
FIG. 2 is a schematic diagram depicting an exemplary embodiment of the sensor assembly.

FIG. 2 shows one embodiment of the sensor assembly 10. Sensor assembly 10 as shown, is one example of the sensing apparatus. Of course, and as applications may require, the configuration of assembly 10 may vary. A PC board 12 has a pair of sensors (low power sensors) 14 and a plurality of electronic components 16 secured to a surface of PC board 12. The sensor assembly 10 with the sensors 14 and electronic components 16 is encapsulated onto PC board 12.

In an exemplary embodiment, PC board 12 is configured to have an arc shape (semicircular, annular) having an inner curved surface 18 for positioning in a facing spaced relationship with respect to a movable member 20. For purposes of illustration, and referring to FIG. 2, movable member 20 is a rotatable member whose movement is facilitated by the opening and closing of a vehicle door, the position thereof is desired. Of course, it is contemplated that movable member 20 and its complementary board 12 can be configured into a variety of configurations to accommodate linear, axial and or rotational movement of member 20 whose movement is facilitated by the object, such as a door opening and closing. The periphery of the moveable member 20 has a predetermined magnetic field distribution. For example, the field distribution may be sinusoidal or otherwise a periodical distribution wherein the predetermined magnetic field varies between a set of north poles and south poles.

Moveable member 20 is mounted to a motor shaft 22 and accordingly, moveable member 20 is rotated in response to a rotational force applied to motor shaft 22.

Accordingly, moveable member 20 rotates while PC board 12 and its sensor assembly are fixedly secured with respect to moveable member 20. Sensors 14 are positioned so that each may generate a signal that is in quadrature with respect to the other. Electronic components 16 include circuits (FIGS. 3, 4, 9 and 10), which provide logic outputs in response to the inputs from the sensors 14. A period 17 and a quarter period 19 are represented by the dashed lines in FIG. 2. It is noted that in order for sensors 14 to generate a pair of periodic signals in quadrature to each other, the sensors 14 need to be appropriately placed with respect to magnetic surfaces of wheel 20. Accordingly, the location of low power sensors 14 in relation to the moving member at a starting or known position is n*(one period of the magnetic field)+¼ period of the magnetic field, where n is the number of magnet pole pairs. This is illustrated by items 17 and 19 of FIG. 2, respectively.

Figure 13:
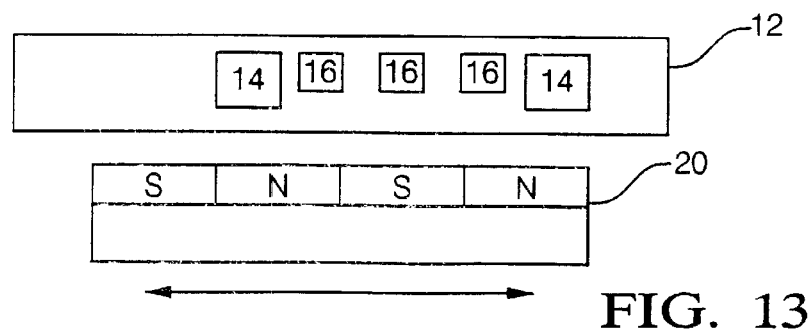
FIG. 13 is a schematic diagram depicting an alternative embodiment of a sensor assembly.

Of course, and as applications may require, the configuration of board 12 and moving member 20 may vary. For example, board 12 is configured to correspond to a moving member 20 that moves linearly with respect to board 12 and the sensors positioned thereon. Accordingly, the linear movement of member 20 with respect to sensors 14 will provide a pair of periodic signals in quadrature with respect to each other. For example, one such alternative is illustrated in FIG. 13.

As an alternative, member 20 may be fixed and board 12 will move with respect to member 20.

Figure 7:
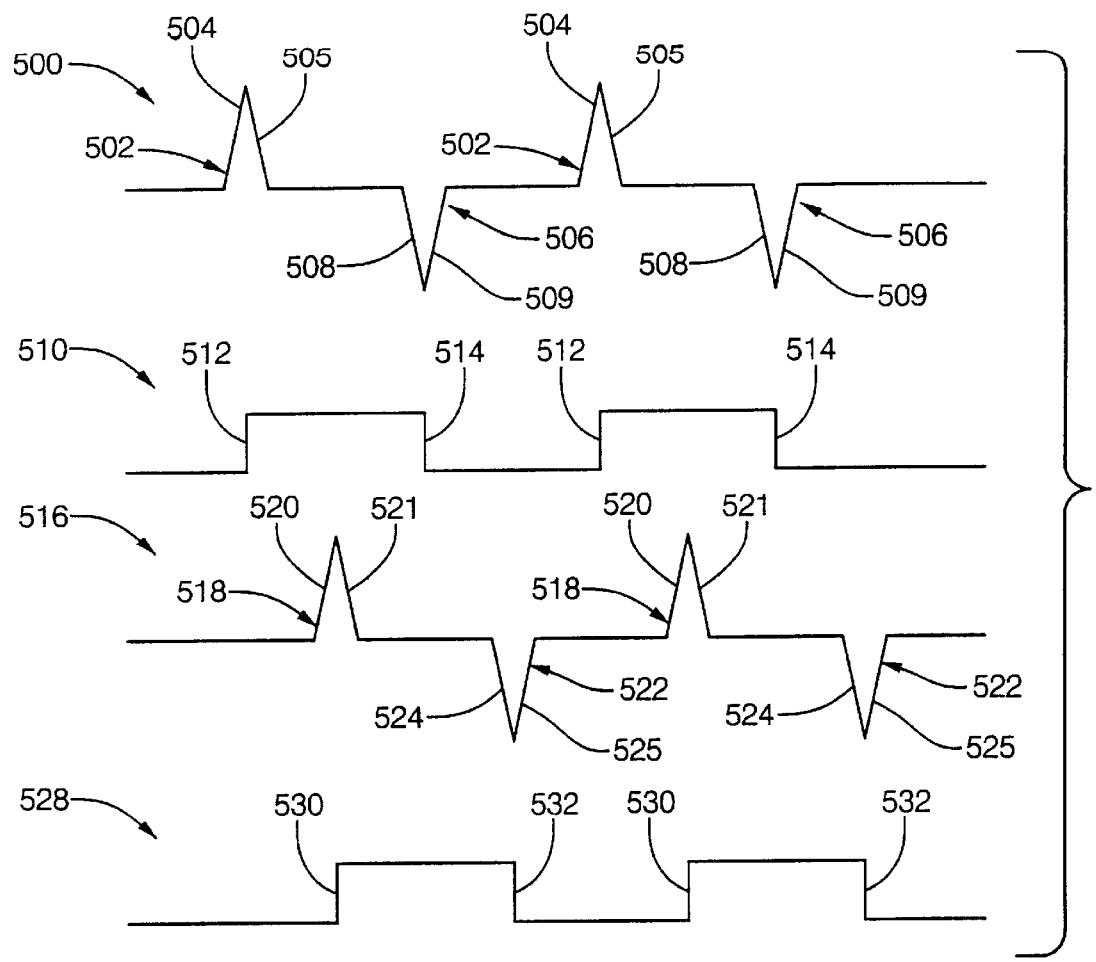
FIG. 7 is a time diagram showing relationships between inputs and outputs of the present invention.

Accordingly, and in accordance with an exemplary embodiment of the present invention, the position of a movable item such as the lift gate of a vehicle is determined by the movement of movable member 20. Movable member 20 is coupled to the object whose position is desired. Accordingly, as the object moves movable member moves. Thus, the movement of the magnetic poles of the movable member are tracked by sensors 14. Sensors 14 are low power or zero power Wiegand sensors or the equivalent thereof that produces a pulse output (FIG. 7) which must be converted into a digital signal (FIG. 7) that is suitable for positioning or velocity determination by a controller.

Thus, and in accordance with an exemplary embodiment of the present invention, a movable member is actuated by the movement of an object whose position is desired. The movable member has a plurality of magnetic field distributions which are tracked by a plurality of sensors that provide an output pulse in response to the movement of the magnetic fields. The sensors are very low power or zero power Wiegand sensors which draw little or no current from the operating system of the item whose object is being tracked for example, a lift gate of the vehicle. However, the pulse output of the sensors must be converted into a digital signal for recognition by a control algorithm of a controller.

Figure 14:
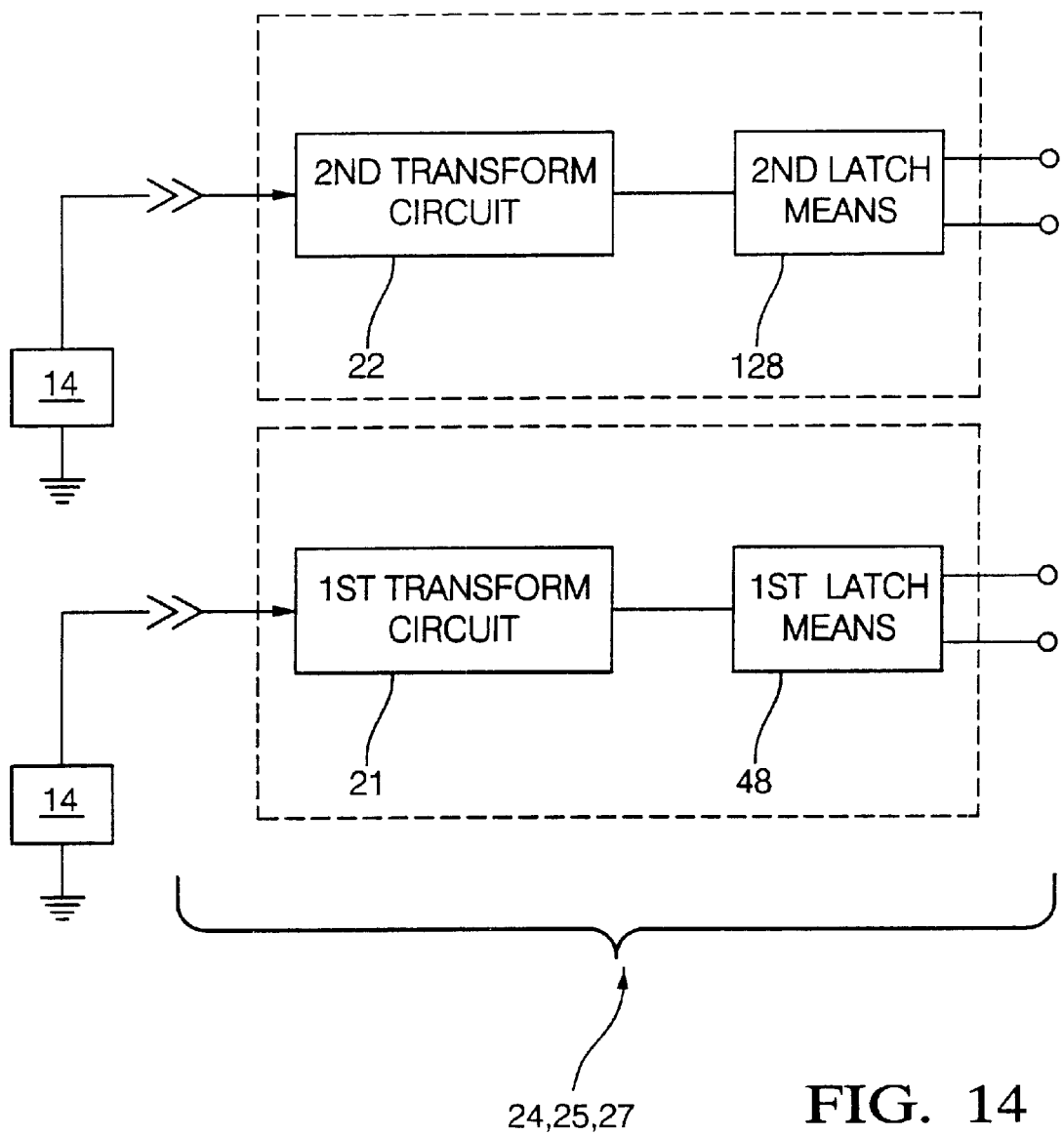
FIG. 14 is a high level block diagram of an exemplary embodiment.

Referring now to FIG. 14, a high level block diagram of an exemplary embodiment is depicted. In an exemplary embodiment, two channels designated as Channel 1 and Channel 2 are employed to provide outputs from sensors 14. In an exemplary embodiment, sensor 14 is a magnetic sensor that generates output pulses. The output pulses are generated when alternating magnetic fields pass near the sensor 14. Sensor 14 is electrically grounded at one end to ground 15 and coupled to a square wave generator at the other end, one for each channel. In an illustrative depiction, a first square wave generator (e.g., Channel One of 24) comprises a first signal transform circuit 21 and first latch means including, but not limited to, a S-R latch e.g. 48. Similarly, for Channel Two, a second square wave generator comprises a second signal transform circuit 22 and a second latch means e.g., 128 respectively. For example, a square wave generator may comprise a circuit interface configured to transform the out put pulses from the sensor 14. The signal transform circuit e.g., 21 in combination with the latch means converts the pulses to a waveform from which position may be ascertained.

Figure 3:
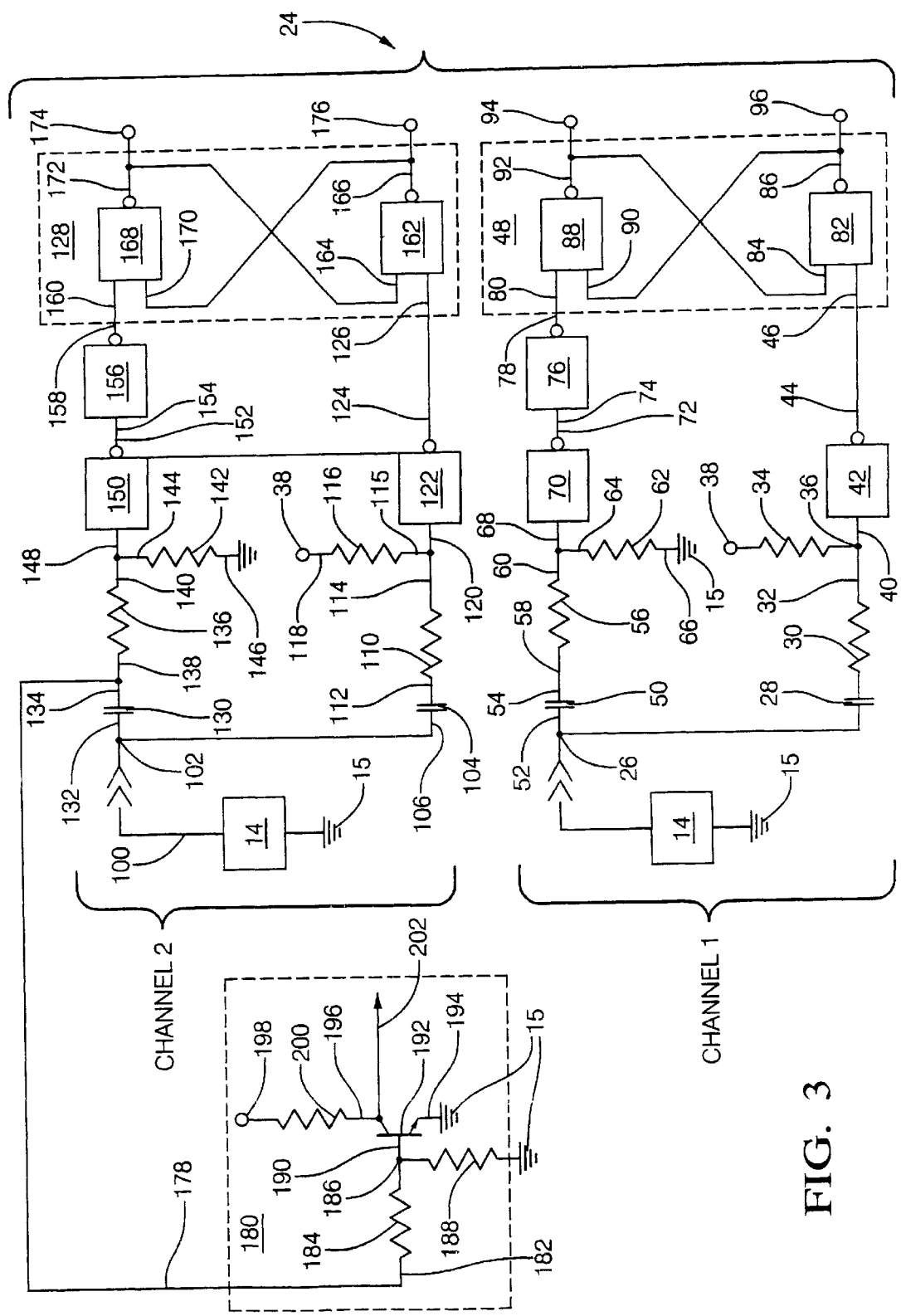
FIG. 3 is circuit diagram illustrating an exemplary embodiment of the sensor assembly with the sensors initiating input.

FIG. 3, a circuit diagram 24 illustrates an exemplary embodiment of the square wave generator necessary to convert the pulse signal of sensors 14. In an exemplary embodiment, two channels designated as Channel 1 and Channel 2 are employed to provide outputs from sensors 14. As shown in the figure in Channel 1, sensor 14 is positioned to provide an output corresponding to the current position of an object such as a vehicle door, which causes moveable member 20 to rotate. In an exemplary embodiment, sensor 14 is a magnetic sensor that generates output pulses. The output pulses are generated when alternating magnetic fields pass near the sensor 14. The amplitude of the pulses generated by the magnets passing near the sensor is not totally dependent upon the field strength. In addition, the amplitude of the pulses generated by the magnets passing near the sensor is independent of the speed of the magnetic fields change or rate of change. As a result of the sensors characteristics, the sensor will require no external power. One such type of sensor is a Wiegand position sensor available from HID Corp.

Sensor 14 is electrically grounded at one end to ground 15 and coupled to a square wave generator at the other end starting at common point 26. Common point 26 is coupled to a first capacitor 28 via a first end of first capacitor 28. First capacitor 28 is connected to a first end of a first resistor 30 via a second end of first capacitor 28. First resistor 30 also has a second end 32 coupled to a fifth resistor 34 via a first end of fifth resistor 34. Fifth resistor 34 further has a second end 36 that is coupled to a low power source 38 such as a 5 volt voltage source.

Second end 32 of first resistor 30 is also coupled to an input 40 of a first NAND gate 42. In one embodiment, first NAND gate 42 is configured into a Schmitt Trigger wherein an output 44 of first NAND gate 42 is maintained at a predetermined level. Output 44 of first NAND gate 42, in turn, is coupled to a first input lead 46 of a first SET-RESET (S-R) latch 48.

Accordingly, first SET-RESET (S-R) latch 48 has two inputs, which includes first input lead 46. Also, HIGHs on the two inputs are the activating inputs. Alternatively, other suitable latches may be used. For example, a $\overline{\text{S}}$-$\overline{\text{R}}$ latch may be used if the polarity of the inputs of the latch is reversed.

Complimentarily, first common point 26 is also coupled to a second capacitor 50 via a first end 52 of second capacitor 50. Second capacitor 50 has a second end 54 connected to a second resistor 56 via a first end 58 of second resistor 56. Second resistor 56 further has a second end 60 coupled to a sixth resistor 62 via a first end 64 of sixth resistor 62. Sixth resistor 62 further has a second end 66 that is coupled to ground 15. Second end 60 of second resistor 56 is coupled to an input 68 of a second NAND gate 70. In one embodiment, second NAND gate 70 is configured into a Schmitt Trigger wherein an output 72 of second NAND gate 70 is maintained at a predetermined level. Output 72 of second NAND gate 70 is coupled to an input 74 of a third NAND gate 76. In one embodiment, third NAND gate 76 is configured into a Schmitt Trigger wherein an output 78 of third NAND gate 76 is maintained at a predetermined level. Output 78 of third NAND gate 76, in turn, is coupled to a second input lead 80 of the first SET-RESET (S-R) latch 48.

Accordingly, first SET-RESET (S-R) latch 48 has two inputs, which includes first input lead 46, as well as second input lead 80. Also, HIGHs on the two inputs are the activating inputs. Alternatively, other suitable latches may be used. For example, a $\overline{S}$-$\overline{R}$ latch may be used if the polarity of the inputs of the latch is reversed.

The first SET-RESET (S-R) latch 48 comprises a first NOR gate 82 that has a first lead that is first input lead 46, as well as a second lead 84. First NOR gate 82 further comprises an output lead 86. First SET-RESET (S-R) latch 48 further comprises a second NOR gate 88 that has a first lead that is second input lead 80, as well as a second lead 90. Second NOR gate 88 further comprises an output lead 92. Second lead 84 of first NOR gate 82 is electrically connected to output lead 92 of second NOR gate 88. Second lead 90 of second NOR gate 88 is electrically connected to output lead 86 of first NOR gate 82.

Output lead 92 of second NOR gate 88 forms a first output lead 94 of first SET-RESET (S-R) latch 48. Output lead 86 of first NOR gate 82 forms a second output lead 96 of first SET-RESET (S-R) latch 48.

Referring now to Channel 2, a second sensor 14 being suitably positioned having a first end coupled to ground 15 and a second end coupled to a square wave generator as described. Second sensor 14 is also a magnetic sensor that generates output pulses when alternating magnetic fields (actuators) pass near the sensor. The amplitude of the poles generated by the sensor is not totally dependent upon the field strength of the actuator, therefore, the sensor will require no external power. One such type of sensor is a Wiegand position sensor available from HID Corp.

Sensor 14 has a second end 100 coupled to a second common point 102. Second common point 102 is coupled to a third capacitor 104 via a first end 106 of third capacitor 104. Third capacitor 104 has a second end 108 connected to a third resistor 110 via a first end 112 of third resistor 110. Third resistor 110 has a second end 114 coupled to a seventh resistor 116 via a first end of seventh resistor 116. Seventh resistor 116 further has a second end 118 that is coupled to a low power source such as a 5 volt voltage source 38. Second end 114 of the third resistor 110 is further coupled to an input 120 of a Fourth NAND gate 122. In one embodiment, Fourth NAND gate 122 is configured into a Schmitt Trigger wherein an output 124 of fourth NAND gate 122 is maintained at a predetermined level. Output 124 of NAND gate 122, in turn, is coupled to a first input lead 126 of a Second SET-RESET (S-R) latch 128.

Accordingly, second SET-RESET (S-R) latch 128 has two inputs, which includes first input lead 126. Also, HIGHs on the two inputs are the activating inputs.

Complimentarily, second common point 102 is also coupled to a fourth capacitor 130 via a first end 132 of fourth capacitor 130. Fourth capacitor 130 has a second end 134 connected to a fourth resistor 136 via a first end 138 of fourth resistor 136. Fourth resistor 136 further has a second end 140 coupled to an eighth resistor 142 via a first end 144 of eighth resistor 142. Eighth resistor 142 further has a second end 146 that is coupled to ground 15. Second end 140 of fourth resistor 136 is further coupled to an input 148 of a fifth NAND gate 150. In one embodiment, the fifth NAND gate 150 is also configured into a Schmitt Trigger wherein an output 152 of the fifth NAND gate 150 is maintained at a predetermined level. Output 152 of the fifth NAND gate 150 is coupled to an input 154 of a sixth NAND gate 156. In one embodiment, sixth NAND gate 156 is configured into a Schmitt Trigger wherein an output 158 of sixth NAND gate 156 is maintained at a predetermined level. Output 158 of sixth NAND gate 156, in turn, is coupled to a second input lead 160 of a Second SET-RESET (S-R) latch 128.

Accordingly, second SET-RESET (S-R) latch 128 has two inputs, which includes first input lead 126, as well as second input lead 160. Also, HIGHs on the two inputs are the activating inputs.

Second SET-RESET (S-R) latch 128 comprises a third NOR gate 162 that has a first lead that is first input lead 126, as well as a second lead 164. Third NOR gate 162 further comprises an output lead 166. Second SET-RESET (S-R) latch 128 further comprises a fourth NOR gate 168 that has a first lead that is second input lead 160, as well as a second lead 170. Fourth NOR gate 168 further comprises an output lead 172. Furthermore, second lead 164 of third NOR gate 162 is electrically connected to output lead 172 of fourth NOR gate 168. Second lead 170 of fourth NOR gate 168 is electrically connected to output lead 166 of third NOR gate 162.

Output lead 172 of fourth NOR gate 168 forms a first output lead 174 of Second SET-RESET (S-R) latch 128. Output lead 166 of third NOR gate 162 forms a second output lead 176 of second SET-RESET (S-R) latch 128.

In addition, a lead 178 of a redundancy circuit 180 is connected between second end 134 of fourth capacitor 130 and first end 138 of fourth resistor 136. The lead 178 leads to first end 182 of a ninth resistor 184. Ninth resistor 184, in turn, has a second end 186, which is coupled to ground 15 via a tenth resistor 188. Furthermore, second end 186 of the ninth resistor 184 is coupled to a base 190 of an npn transistor 192. The npn transistor has an emitter 194 coupled to ground 15. Additionally, the transistor has a collector 196 coupled to a power source 198 via an eleventh resistor 200. It is noted that the power source 198 may be identical to that of the power source 38. The collector 196 is also coupled to a controller (not shown) via an output lead 202.

It is noted that sensor 14, can be any suitable sensor that takes advantage of the Wiegand effect. In the instant embodiment, a series 2000 Weigand sensor, manufactured by HID Corporation, is used.

Figure 4:
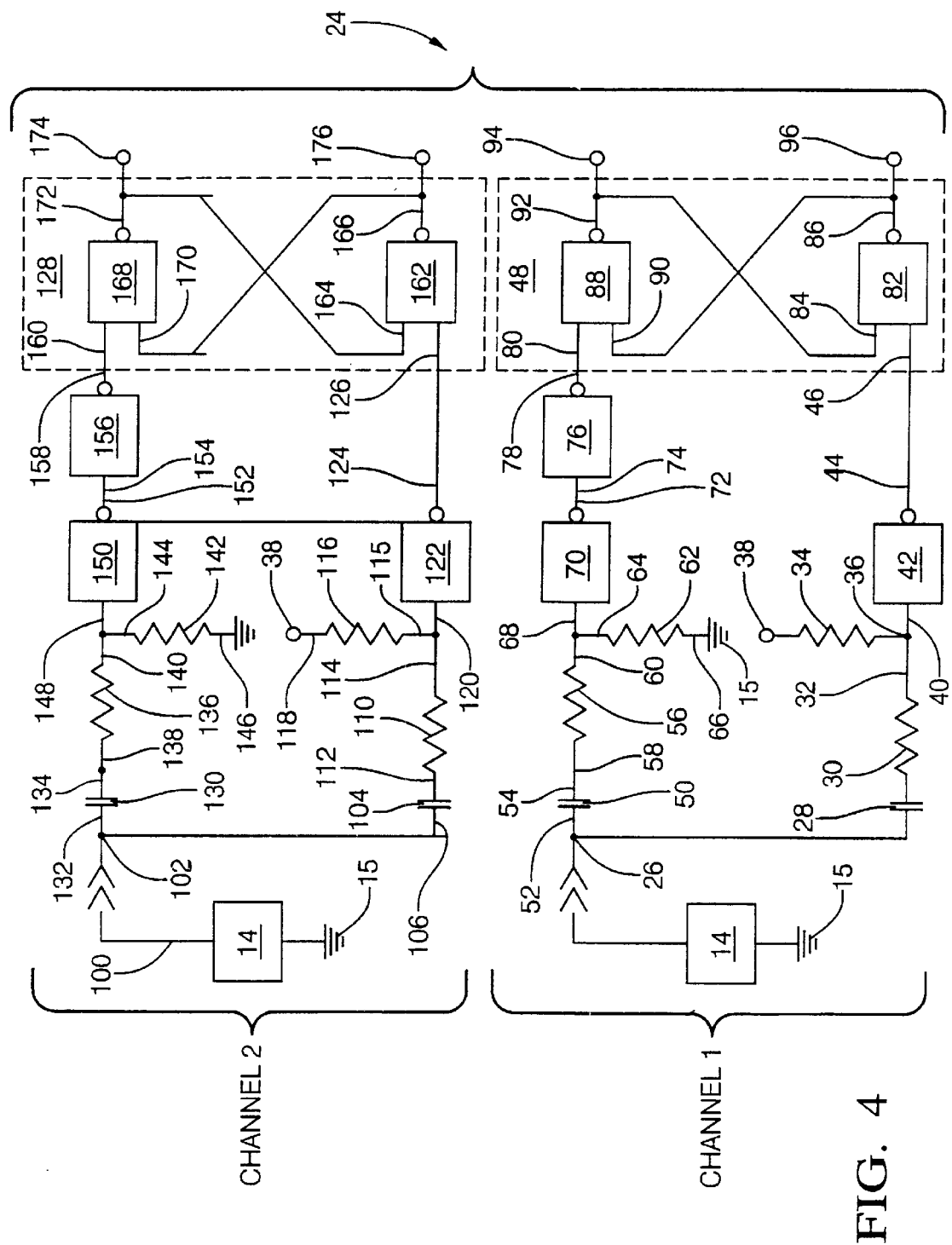
FIG. 4 is a circuit diagram of another embodiment with the sensors initiating input.

Referring to FIG. 4, an alternative embodiment of the present invention is described. As can be appreciated, the circuit or the structure is substantially the same with the exception that the redundancy circuit 180 of FIG. 3 is not included.

As can be appreciated, the redundancy circuit 180 is maintained for the purpose that when the circuit of FIG. 4 is temporarily disrupted or otherwise not functioning properly, the redundancy circuit 180 still keeps the controller informed. Accordingly, a sensed signal by the low power sensor 14, such as a Wiegand effect sensor, such as a positive voltage periodic signal still periodically switches the npn transistor 192 from ON state to OFF state thereby informing the controller with such information as a position count. This is accomplished independently of the other circuitry coupled to the low power sensor 14, such as a Wiegand effect sensor.

Figure 5:
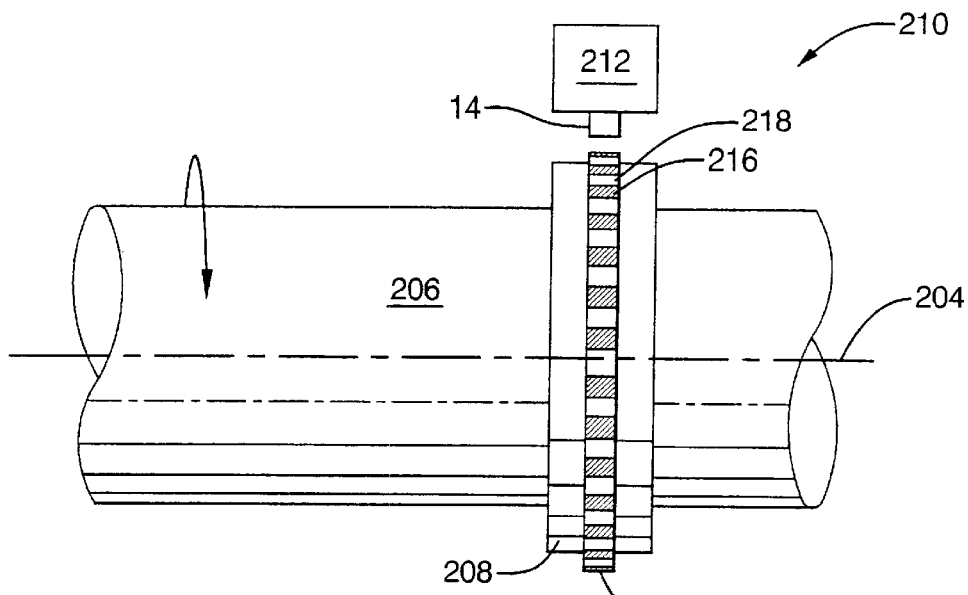
FIG. 5 is a side view of the exemplary diagram of the sensor assembly.

FIG. 5 shows an exemplary sensor system 210 using two low power sensors 14 (not shown), such as Wiegand effect sensors mounted on the stationary member 212. The stationary member 212 faces the moving member 206 having the relative center 204 and disposed on the moving member 206 is a magnetized surface 208. In a preferred embodiment, the magnetized surface 208 has a periodical magnetic track 214 disposed on the moving member 206. The periodical magnetic track 214 has north poles 216 and south poles 218 on its periphery, as shown. Moving member 206 is coupled to a motor shaft or alternatively, is the motor shaft itself. In one embodiment, the motor shaft is a shaft of an electric motor 207 (See also FIG. 1) which facilitates the movement of a liftgate 3 from a closed position to an open position and vice versa. One such liftgate 3 and motor 207 is illustrated in FIG. 1.

As an alternative, moving member 206 may be a shaft of an electric motor which facilitates the opening and closing of an automobile trunk. As yet another alternative movable member 206 may be a magnetic strip positioned on a member that moves linearly with respect to the low power sensors.

As yet another alternative, moving member 206 is coupled to or is a portion of a hinge pin 209 (See also FIG. 1) of liftgate 3. Thus, as liftgate 3 opens and closes moving member 206 will rotate and its position will be tracked by sensors 14.

The north poles 216 and south poles 218 passing near the sensor generate the resultant variation in magnetic field. The variations in magnetic field are sensed by the two low power sensors 14, such as Wiegand effect sensors. The magnetic track 214 on the wheel 208 allows a sensing mechanism using circuit 10 in FIG. 2 to perform several functions as described. In addition, the stationary member 212 can be an electronic circuit board.

Figure 6:
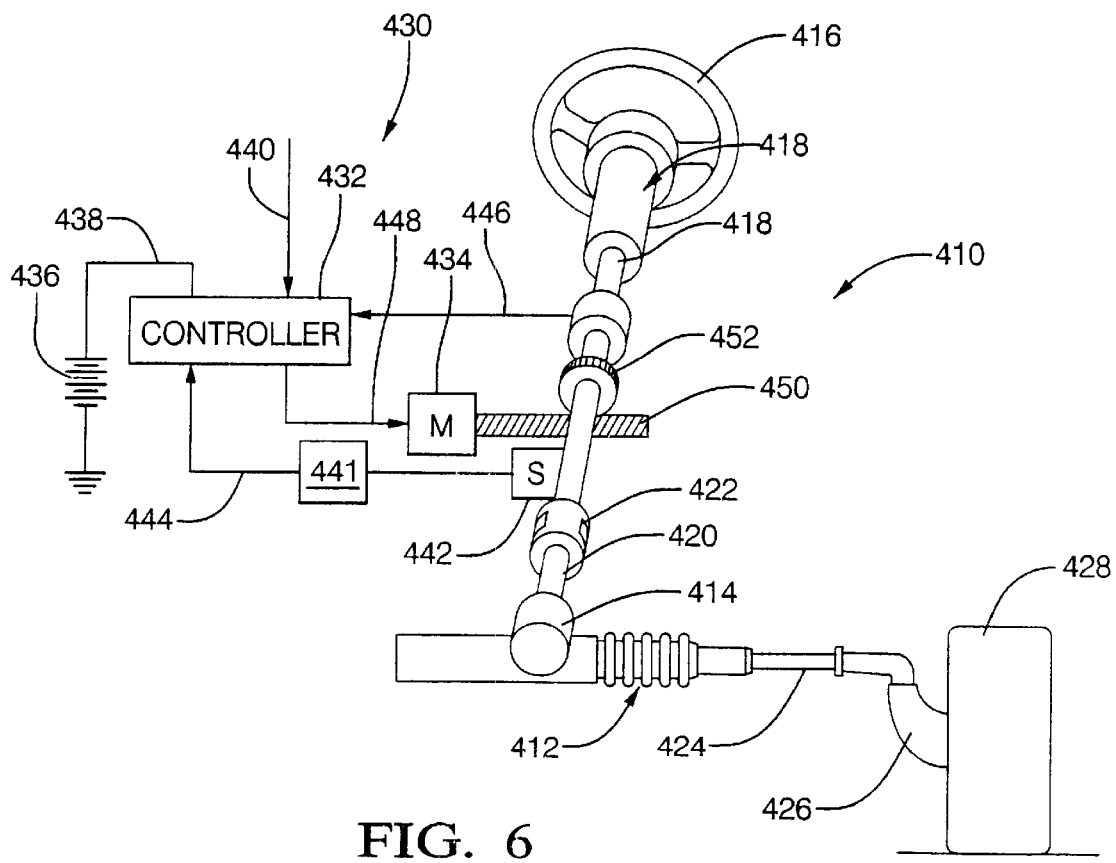
FIG. 6 is an application using the present invention.

In an alternate application of the sensor assembly may be used in a vehicle steering system. Referring to FIG. 6, reference numeral 410 generally designates a motor vehicle power steering system. The steering mechanism 412 is a rack-and-pinion type system and includes a toothed rack (not shown) and a pinion gear (also not shown) located under gear housing 414. As the steering wheel 416 is turned, the upper steering shaft 418, connected to the lower steering shaft 420 through universal joint 422, turns the pinion gear. Rotation of the pinion gear moves the toothed rack, which moves tie rods 424 (only one shown) that in turn move the steering knuckles 426 (only one shown), which turn wheels 428 (only one shown).

Electric power steering assist is provided through the unit generally designated by reference numeral 430 and includes a controller 432 and the electric motor 434. The controller 432 is powered by a vehicle power supply 436 through line 438. The controller 432 receives a signal representative of the vehicle velocity on line 440. Steering pinion gear angle is measured through torque sensor 442, which may be a pair of low power sensors, such as Wiegand effect sensors as described in FIGS. 1–4 or any other suitable type of position sensor, and coupled to the controller 432 via the circuit 441 through line 444. In addition, locations other than the location measuring the steering pinion gear angle may be used to implement the instant invention.

As the steering wheel 416 is turned, torque sensor 442 senses the torque applied to the steering wheel 416 by the vehicle operator. The torque sensor 442 may include a torsion bar (not shown) and a variable resistive-type sensor (also not shown), which outputs a variable resistance signal to controller 432 through line 446 in relation to the amount of twist on the torsion bar. Although this is the preferable torque sensor, any other suitable torque-sensing device used with known signal processing techniques will suffice.

In response to the inputs on lines 440, 444, and 446, the controller 432 sends a current command or a voltage command through line 448 to the electric motor 434. The motor 434 in turn supplies torque assist to the steering system through a worm 450 and a worm gear 452, in such a way as to providing a torque assist to the vehicle steering in addition to a driving force exerted by the vehicle operator.

Referring to FIGS. 7 and 8 and once again to FIG. 3, a set of waveforms relating to an exemplary embodiment of the present invention is depicted. A waveform 500 represents a sensed signal such as a voltage signal the second end of first low power sensor 14. A set of positive triangular pulses 502 passes through second capacitor 50 and trigger second NAND gate 70 respectively one at a time. If second NAND gate 70 is a Schmit trigger, at a certain point 504, and 505 the Schmit trigger will be activated. Accordingly, NAND gate 70 is triggered at a set of predetermined points in each positive and negative swing of each positive triangular pulse of the waveform 500. Similarly, a set of negative triangular pulses 506 passes through second capacitor 50 and trigger first NAND gate 42 respectively one at a time. If first NAND gate 42 is a Schmit trigger, at a certain point 508 and 509 the Schmit trigger will be activated.

Therefore, first NAND gate 42 is triggered at a set predetermined point in each negative and positive swing of each negative triangular pulse of the waveform 500.

The output waveform between first output lead 94 of first SET-RESET (S-R) latch 48, and second output lead 96 of first SET-RESET (S-R) latch 48 is a waveform 510. The set of positive triangular pulses 502 in combination with the set of negative triangular pulses 506 corresponds to a set of rising edges 512, and a set of falling edges 514 of the waveform 510.

Correspondingly, a waveform 516 represents a sensed signal such as a voltage signal at second end 100 of second low power sensor 14. A set of positive triangular pulses 518 pass through fourth capacitor 130 and trigger fifth NAND gate 150 one pulse at a time. If fifth NAND gate 150 is a Schmit trigger, at a set of certain points 520, and 521 the Schmit trigger will be activated. In other words, fifth NAND gate 150 is triggered at a set of predetermined points 520, 521 in each positive and negative swing of each positive triangular pulse 518 of the waveform 516. Similarly, a set of negative triangular pulses 522 passes through third capacitor 104 and trigger fourth NAND gate 122 one pulse at a time. If fourth NAND gate 122 is a Schmit trigger, at a set of certain points 524 and 526 the Schmit trigger will be activated. In other words, fourth NAND gate 122 is triggered at a set of predetermined points in each positive and negative swing of each negative triangular pulse of the waveform 516.

The output waveform between first output lead 174 of second SET-RESET (S-R) latch 128, and second output lead 176 of second SET-RESET (S-R) latch 128 is a waveform 528. The set of positive triangular pulses 518 in combination with the set of negative triangular pulses 522 corresponds to a set of rising edges 530, and a set of falling edges 532 of the waveform 510.

Figure 8:
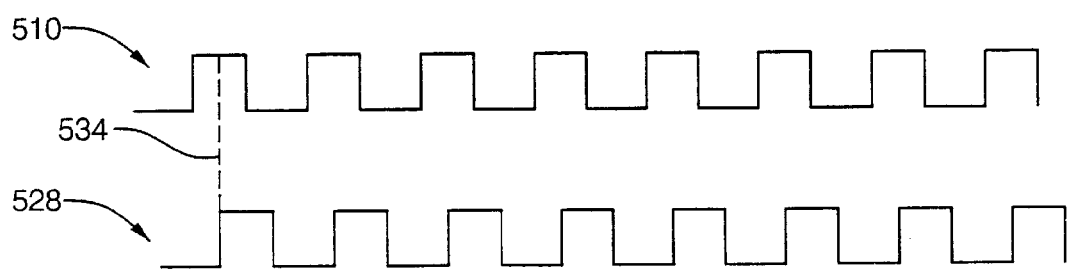
FIG. 8 is a diagram showing the periodical nature of the output signals generated by the device of the present invention.

FIG. 8 shows the periodic nature of the waveform 510 and the waveform 528. Note that the waveform 510 and the waveform 528 are related in quadrature. In other words, the waveform 510 and the waveform 528 are ninety electrical degrees apart. A broken line 534 depicts the 90 degree phase difference between the waveform 510 and the waveform 528.

Figure 9:
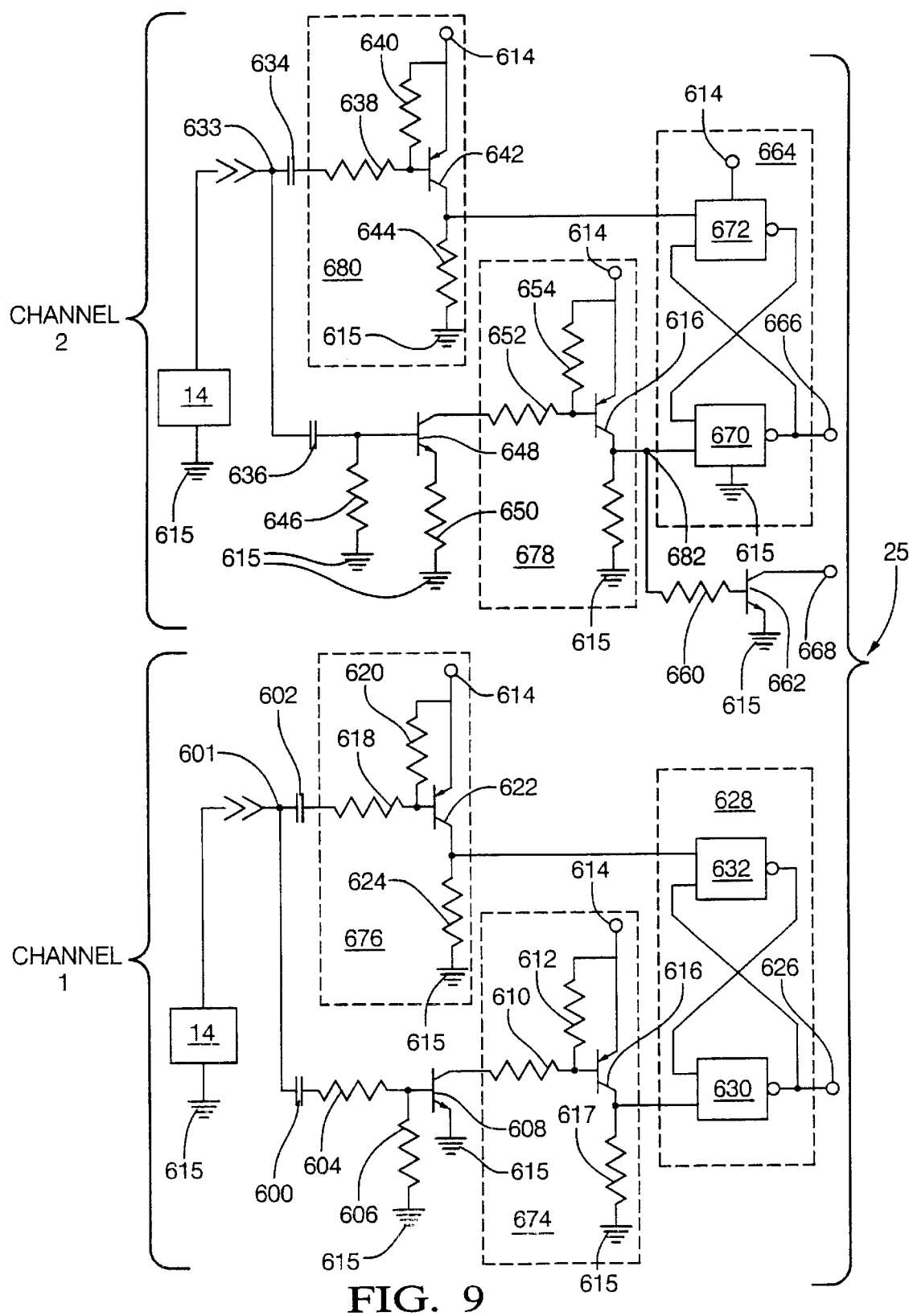
FIG. 9 is a circuit diagram of another embodiment with two channels and the sensors providing input.

FIG. 9 shows another embodiment of the sensor assembly circuitry. The circuit diagram 25 illustrates an exemplary embodiment of the square wave generator. The exemplary circuit in circuit diagram 25 is similar to the circuits of circuit diagram 24 in FIGS. 3 and 4. Sensor 14 is electrically grounded at one end to ground 615 and coupled to a square wave generator at the other end starting at common point 601. Common point 601 is coupled to a first capacitor 600. First capacitor 600 is connected to a first resistor 604. First resistor 604 is coupled to a second resistor 606. Second resistor 606 is coupled to the ground 615. First resistor 604 is coupled to a base of first transistor 608 an npn transistor. The npn transistor 608 has an emitter coupled to ground 615. The collector of transistor 608 is coupled to first inverter 674. First inverter is coupled to a first SET-RESET (S-R) latch 628.

Accordingly, first SET-RESET (S-R) latch 628 has two inputs, which includes first input from the first inverter 674.

Complimentarily, first common point 601 is also coupled to a second capacitor 602. Second capacitor 602 is connected to a second inverter 676. Second inverter 676 is coupled to the first SET-RESET (S-R) latch 628.

Accordingly, first SET-RESET (S-R) latch 628 has two inputs, which includes the first inverter 674 and the second inverter 676. Also, HIGHs on the two inputs are the activating inputs. Alternatively, other suitable latches may be used. For example, a $\overline{\text{S-R}}$ latch may be used if the polarity of the inputs of the latch is reversed.

The first SET-RESET (S-R) latch 628 comprises a first NOR gate 630 and a second NOR gate 632. First NOR gate 630 and second NOR gate are cross-coupled in connection similar to the Set-Reset latch 48 in FIG. 3. The SET-RESET latch 628 has one output lead 626.

Referring now to Channel 2, a second sensor 14 being suitably positioned having a first end coupled to ground 615 and a second end coupled to a square wave generator as described. Sensor 14 is coupled to a second common point 633. Second common point 633 is coupled to a fourth capacitor 636. Fourth capacitor 636 is connected to an eleventh resistor 646. Eleventh resistor 646 is coupled to ground 615. The eleventh resistor 646 is coupled to the base of a fifth transistor 648 an npn transistor. The npn transistor's emitter is coupled to a twelfth resistor 650 which is coupled to ground 615. Transistor 648 has a collector coupled to a third inverter 678. The inverter 678 is coupled to a common point 682. The common point 682 is coupled to a sixteenth resistor 660. The sixteenth resistor 660 is coupled to a seventh transistor 662. The seventh transistor's 662 emitter is coupled to ground 615. The seventh transistor's 662 collector is coupled to an output lead 668. The common point 682 is coupled to a second SET-RESET (S-R) latch 664.

Complimentarily, second common point 633 is also coupled to a third capacitor 634. Third capacitor 634 is connected to a fourth inverter 680. Fourth inverter 680 is coupled to the second SET-RESET (S-R) latch 664.

Accordingly, second SET-RESET (S-R) latch 664 has two inputs, which includes input from the common point 682 and the fourth inverter 680. Also, HIGHs on the two inputs are the activating inputs.

Second SET-RESET (S-R) latch 664 comprises a third NOR gate 670. Third NOR gate 670 is coupled to ground 615. Second SET-RESET (S-R) latch 664 further comprises a fourth NOR gate 672. Fourth NOR gate 672 is coupled to a low power source 614 such as a 5 volt voltage source. The third NOR gate 670 and the fourth NOR gate 672 are cross-coupled similar to the NOR gates of SET-RESET latch 628. Output lead 666 of third NOR gate 670 forms a first output lead 666 of second SET-RESET (S-R) latch 664.

Figure 10:
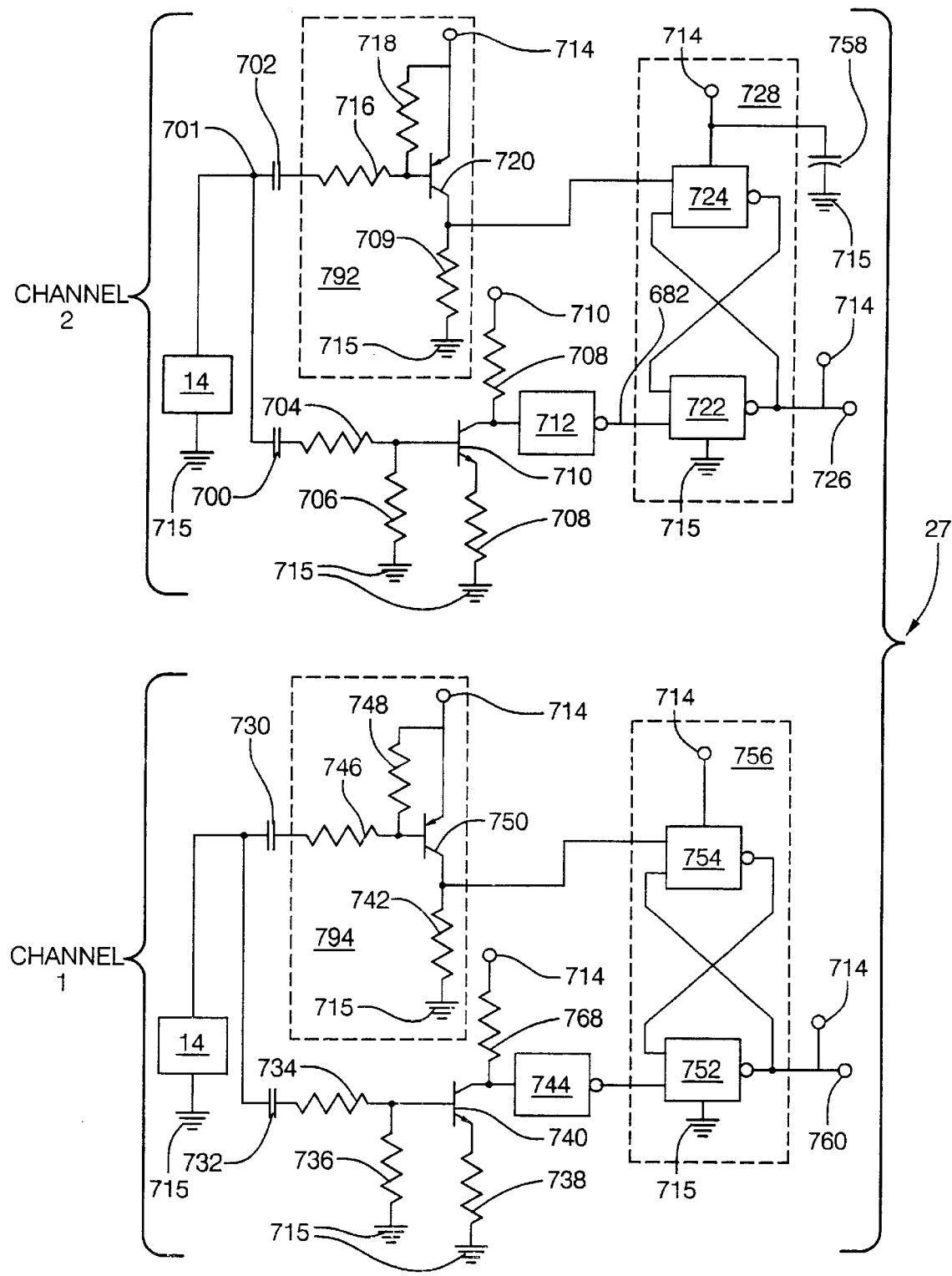
FIG. 10 is a circuit diagram of another exemplary embodiment with two channels and the sensor providing input.

Referring now to FIG. 10 showing another exemplary embodiment of the circuitry. The circuit diagram 27 illustrates an exemplary preferred embodiment of two channels of the square wave generator. The exemplary circuit in circuit diagram 27 is similar to the circuits of circuit diagram 24 and 25 in FIGS. 3, 4 and 9. In Channel 1 sensor 14 is electrically grounded at one end to ground 715 and coupled to a square wave generator at the other end starting at common point 701. Common point 701 is coupled to a first capacitor 700. First capacitor 700 is connected to a first resistor 704. First resistor 704 is coupled to a second resistor 706. Second resistor 706 is coupled to the ground 715. First resistor 704 is coupled to a base of first transistor 710 an npn transistor. The npn transistor 710 has an emitter coupled to third resistor 708 which is coupled to ground 715. The collector of transistor 710 is coupled to thirteenth resistor 762, which is coupled to a low power source 714 such as a 5 volt voltage source. First transistor 710 is coupled to a first NAND gate 712. First NAND gate 712 is coupled to a first SET-RESET (S-R) latch 728.

Accordingly, first SET-RESET (S-R) latch 728 has two inputs, which includes input from the first NAND gate 712.

Complimentarily, first common point 701 is also coupled to a second capacitor 702. Second capacitor 702 is connected to a first inverter 792. First inverter 792 is coupled to the first SET-RESET (S-R) latch 728.

Accordingly, first SET-RESET (S-R) latch 728 has two inputs, which includes the first NAND gate 712 and the first inverter 792. Alternatively, other suitable latches may be used. For example, a $\overline{\text{S-R}}$ latch may be used if the polarity of the inputs of the latch is reversed.

The first SET-RESET (S-R) latch 728 comprises a first NOR gate 722 and a second NOR gate 724. The first NOR gate 722 is connected to ground 715. The first NOR gate 722 also has a lead that is connected to a low power source 714 such as a 5 volt voltage source. The second NOR gate 724 is coupled to the low power source 714 and further coupled to a fifth capacitor 758 which is coupled to ground 715. First NOR gate 722 and second NOR gate 724 are cross-coupled in connection similar to the Set-Reset latch 664 in FIG. 9. The SET-RESET latch 728 has one output lead 726.

Channel 2 of the circuit diagram 27 is similar to Channel 1 of circuit diagram 27. The exception is that second NOR gate 754 is not coupled to a capacitor which is grounded (second capacitor 724 is coupled to fifth capacitor 758 which is grounded 715). Channel 2 has an output lead 760.

Figure 11:
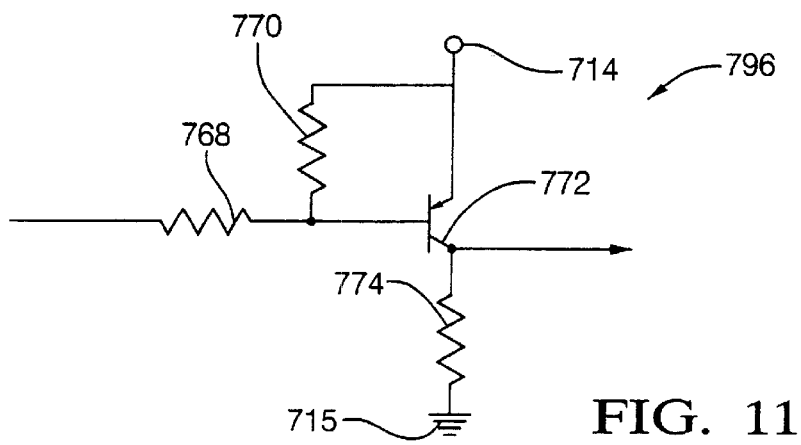
FIG. 11 is a circuit diagram of an exemplary embodiment of a discrete inverter stage.

Turning now to FIG. 11, which shows an exemplary embodiment of a discrete inverter stage 796. The inverter 796 is typically coupled to a capacitor and a SET-RESET latch. The inverter 796 couples a first resistor 768 from a capacitor (not shown). The first resistor 768 is coupled to a second resistor 770. The first resistor is further coupled to a first transistor 772. The first transistor 772 is a pnp transistor. The transistor collector is coupled to a third resistor 774 which is coupled to ground 715. The emitter of transistor 772 is coupled to a low power source 714 such as a 5 volt voltage source. The emitter of transistor 772 is further coupled to the second resistor 770.

Figure 12:
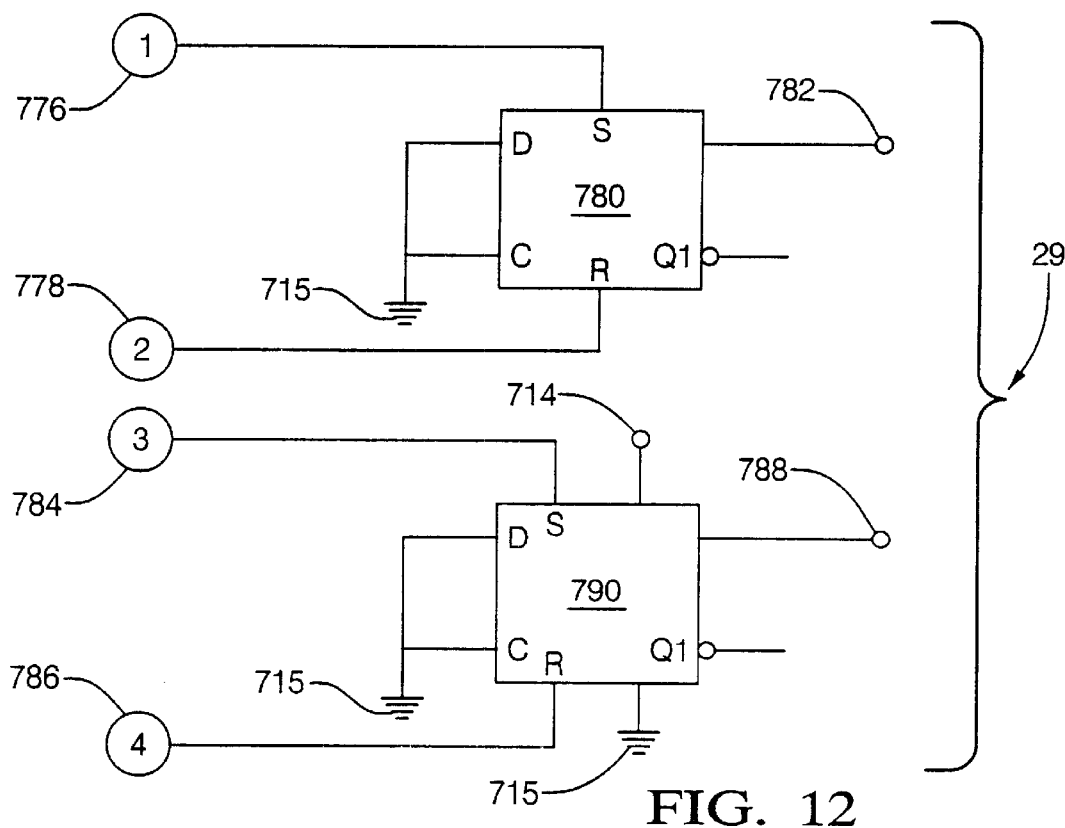
FIG. 12 is a logic symbol of an exemplary alternate embodiment of a dual set-reset latch.

Turning now to FIG. 12, an alternate exemplary embodiment of the dual SET-RESET is shown. The logic symbol 29 illustrates an exemplary embodiment of two channels of an alternate SET-RESET latch or dual SET-RESET flip flop. The SET-RESET flip flop 780 is shown with a first input 776 coupled to S (set input), and a second input 778 coupled to R (reset input). Both the D (data input) and C (control input) are coupled to ground 715. One output lead 782 is shown.

The second SET-RESET flip flop 790 is similar to the first SET-RESET flip flop 780 with the addition of connections to a low power source 714 and to ground 715. The second SET-RESET 790 has one output lead 788 and two inputs 784 and 786 connected to the S input and R input respectively.

It is noted that one embodiment of the sensor assembly utilizes two low power sensors, as well as low current electronics to derive position and direction information on a member such as the moving member 20 as discussed above. The total current draw is less than most known sensors used for position and direction information sensing purposes. In the present embodiment, the total current draw is less than 5 micro-Amperes. The inherent nature of the low power sensor, such as a Wiegand effect sensor forms a basis of the low total current draw. This is in part because that low power sensor, such as a Wiegand effect sensor consumes virtually no energy. Furthermore, compared with sensors that consume larger quantities of energy, electric or otherwise, the above total current draw of less than 5 micro-Amperes is about 7,000 to 8,000 times less than the sensors that consume larger quantities of energy.

In one known sensor system that consumes larger quantities of energy, e.g., a power liftgate and power sliding door, that uses an optical position encoder drawing 30 to 40 mili-Amperes of current whenever the liftgate or door is open. The sensor system function is to keep track of the door position. A drawback of the above sensor system is the undesirable discharge of a portable power source such as a vehicle battery. In order to conserve power consumption, the sensor system shuts down power after a pre-determined time interval. The act of shutting down the power to the sensor system after a predetermined time, disables the sensor system and defeats the system function of determining the position of the liftgate or sliding door.

In addition, and for an exemplary embodiment of the present invention to function as desired, electronic devices convert the set of pulse outputs from the low power sensor, such as a Wiegand effect sensor to a set of suitable signals for position (or velocity) determination by a controller. In other words, for proper interfacing between the outputs of the low power sensor, such as a Wiegand effect sensor and the controller, some electronic devices may be required. In one embodiment, standard integrated complimentary metal oxide semiconductors (CMOS) logic gate devices are used. CMOS consumes less energy than most other suitable devices. Discrete transistors and their concomitant components may be used. In the various embodiments, all transistors CMOS gates are designed to be in the off non-active state until the Weigand sensors generate voltage pulses. Thus, the quiescent current is extremely low and is only the semiconductor leakage currents. Accordingly, the position sensing system as discussed herein provides a means for tracking the position of a vehicle door while drawing virtually little or no power from the vehicles electrical supply. This is particularly important in applications where the tracking of the vehicle door is desired during periods when the vehicle engine is shut off and there is no internal power being supplied to the vehicle battery. For example, a control algorithm which inhibits the starting of a vehicle if one of the vehicle doors is open. It can be appreciated that the redundancy circuit 180 can be coupled to locations other than the location shown and described in FIG. 3. For instance, the line 178 can be coupled to first sensor (14) by connecting the line 178 to a juncture between second end 54 of second capacitor 50 and first end 58 of second resistor 56. In addition, by suitably altering the polarity of the components of the redundancy circuit 180, the line 178 can be coupled to first sensor (14) at other locations. Similarly, the line 178 can be coupled to second sensor 14 at other locations.

It can be appreciated that a very low power quadrature position sensing system can be described. The system includes a first sensor 14, which defines a starting point of a first channel. First sensor 14 is coupled to a first SET-RESET latch 48 having a first input 46 and a second input 80 via a first channel. A second sensor 14, in quadrature with a first sensor 14, defining a starting point of a second channel having very low energy consumption, with second sensor 14 coupled to SET-RESET latch 128 having a first input 126 and a second input 160 via a second channel. The system further includes a moving member 206 having a center 204 equidistance to first sensor 14, and second sensor 14, the moving member 206 further having a magnetized surface 208. Magnetized surface 208 has a magnetic distribution disposed to being sensed by the first sensor 14, and the second sensor 14. During movement by the moving member 206, the first sensor 14 generating a set of positive triangular pulses 502 forming a rising edge 512 and generating a set of negative triangular pulses 506 forming a falling edge 514 of a square wave generated by the first square wave generator including SET-RESET latch 48. During the movement by the moving member 206, the second sensor 14 generating a set of positive triangular pulses 518 forming a rising edge 530 and generating a set of negative triangular pulses 522 forming a falling edge 532 of a square wave generated by second square wave generator including SET-RESET latch 128.

A method for very low power quadrature position sensing includes the determination of a first set of sensed signals (waveform 500) using a first sensor 14 and the determination of a second set of sensed signals (waveform 516) using a second sensor 14. The method includes deriving a first sequence of square waves (waveform 510) from the first set of sensed signals (waveform 500). The method further includes deriving a second sequence of square waves (waveform 528) from the second set of sensed signals (waveform 516) that are in quadrature with the first sequence of square waves (waveform 510). A redundancy sequence signal is generated using a redundancy circuit 180 that comprises a switch 192.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What is claimed is:

1. A position sensing system, comprising:
   a first sensor defining a starting point of a first channel with said first sensor coupled to a first square wave generator;
   a second sensor, in quadrature with said first sensor, defining a starting point of a second channel with said second sensor coupled to a second square wave generator; and
   a movable member having a magnetized surface having a magnetic distribution disposed on said magnetized surface for being sensed by said first sensor and said second sensor, said first sensor generates a high signal forming a rising edge of a square wave signal generated by said first square wave generator, and said first sensor generates a low signal forming a falling edge of said square wave signal generated by said first square wave generator during said movement of said movable member, said second sensor generates a high signal forming a rising edge of a square wave generated by said second square wave generator and said second sensor generates a low signal forming a falling edge of a square wave generated by said second square wave generator.

2. The position sensing system as in claim 1, further comprising:
   a first signal transform circuitry having,
   a first end coupled to said first sensor; and
   a second end coupled to a first input of a first latch means.

3. The position sensing system as in claim 2, further comprising:
   a second signal transform circuitry having,
   a first end coupled to said second sensor; and
   a second end coupled to a first input of a second latch means.

4. The position sensing system as in claim 3, wherein said first and said second signal transform circuitry include CMOS gates designed to be in the off non-active state until said first sensor and said second sensor generate voltage pulses.

5. The position sensing system as in claim 4, wherein said movable member is a shaft of an electric motor coupled to a liftgate of a vehicle, said electric motor providing an urging force for manipulating a position of said liftgate.

6. The position sensing system as in claim 2, wherein said first signal transform circuitry comprises a first NAND gate having an input and an output having said input coupled to said first sensor and said output coupled to said first input of said first latch means;
   a second NAND gate having an input end and an output end, said NAND gate input end is coupled to said first sensor; and
   a third NAND gate having an input end, and an output end, said third NAND gate output end is coupled to a second input end of said first latch means, said second NAND gate and said third NAND gate being connected in series having said output of said second NAND gate coupled to said input end of said third NAND gate, thereby said high signal being disposed to pass therethrough.

7. The position sensing system as in claim 2, further comprising:
   a redundancy circuit coupled to said second sensor, said redundancy circuit including, a switch having an input end and an output end, said switch being switchably triggered by a signal derived from said second sensor acting upon said input end of said switch; and
   an output of said redundancy circuit dependent upon a set of conditions at said input end of said switch with said output of said redundancy circuit being coupled to said output end of said switch.

8. The position sensing system as in claim 7, wherein said switch comprises a transistor.

9. The position sensing system as in claim 1, further comprising:
   a controller coupled to said first square wave generator, said second square wave generator, and a redundancy circuit for controlling said position sensing system including counting a number of square waves generated by said first square wave generator, and counting a number of square waves generated by said second square wave generator.

10. The position sensing system as in claim 2, wherein, said first latch means comprises a set-reset latch.

11. The position sensing system as in claim 3, wherein, said second latch means comprises a set-reset latch.

12. The position sensing system as in claim 2, wherein, said first sensor is a zero power sensor capable of generating a voltage pulse as said magnetized surface moves with respect to said first sensor.

13. The position sensing system as in claim 2, wherein, said second sensor is a zero power sensor capable of generating a voltage pulse as said magnetized surface moves with respect to said second sensor.

14. The position sensing system as in claim 1, wherein said first sensor and said first square wave generator exhibit a total quiescent operation current of less than one milliampere.

15. The position sensing system as in claim 1, wherein said quiescent operation current is less than ten microamperes.

16. The position sensing system as in claim 1, wherein said second sensor and said second square wave generator exhibit a total quiescent operation current of less than one milliampere.

17. A position sensing system for a vehicle, comprising:
   a first sensor defining a starting point of a first channel with said first sensor coupled to a first square wave generator;
   a second sensor, in quadrature with said first sensor, defining a starting point of a second channel with said second sensor coupled to a second square wave generator; and
   a moving member having a magnetized surface having a magnetic distribution disposed on said magnetized surface for being sensed by said first sensor, and said second sensor, said moving member being configured, dimensioned and positioned to move within a range defined by a first position and a second position, said first position corresponding to an open position of a vehicle door and said second position corresponding to a closed position of said vehicle door, and said moving member moves within said range as said vehicle door moves from said first position to said second position or moves from said second position to said first position, said first sensor generates a high signal forming a rising edge of a square wave signal generated by said first square wave generator and said first sensor generates a low signal forming a falling edge of said square wave signal generated by said first square wave generator, and during said movement by said moving member, said second sensor generates a high signal forming a rising edge of a square wave generated by said second square wave generator and said second sensor generates a low signal forming a falling edge of a square wave generated by said second square wave generator.

18. A position sensing system as in claim 17, wherein said vehicle door is a sliding door of a van.

19. The position sensing system as in claim 17, wherein said moving member is a shaft of an electric motor, said electric motor being configured and positioned to provide an urging force to said vehicle door.

20. The position sensing system as in claim 17, wherein said moving member is a hinge pin of said vehicle door.

21. The position sensing system as in claim 17, wherein the location of said first and second sensors in relation to the moving member at a starting position is n*(one period of the magnetic field)+¼ period of the magnetic field of said moving member, where n is the number of magnetic pole pairs.

22. A method for position sensing comprising:
generating a first set and a second set of output signals using a first and sensor and a second sensor, said first set and said second set of output signals generating a pulse waveform;
inputting said first set and said second set of output signals into a square wave generator;
deriving a first sequence of square waves from said first set of sensed signals; and
deriving a second sequence of square waves from said second set of sensed signals that are in quadrature with said first sequence of square waves; and
generating a redundancy sequence signal using a redundancy circuit comprising a switch.

* * * * *